United States Patent
Lahman et al.

(10) Patent No.: US 10,778,795 B2
(45) Date of Patent: *Sep. 15, 2020

(54) SYNCHRONIZATION OF PROPERTY VALUES BETWEEN A CLIENT AND A SERVER

(71) Applicant: Microsoft Technology Licensing, LLC, Redmond, WA (US)

(72) Inventors: Aaron Lahman, Redmond, WA (US); Yasser Shaaban, Seattle, WA (US); Mariyan Fransazov, Kirkland, WA (US); Alexander Jon Dobin, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 128 days.

This patent is subject to a terminal disclaimer.

(21) Appl. No.: 15/419,982

(22) Filed: Jan. 30, 2017

(65) Prior Publication Data

US 2018/0219962 A1    Aug. 2, 2018

(51) Int. Cl.
*G06F 15/16* (2006.01)
*H04L 29/08* (2006.01)
(Continued)

(52) U.S. Cl.
CPC .......... *H04L 67/2804* (2013.01); *G06F 9/547* (2013.01); *G06F 9/548* (2013.01);
(Continued)

(58) Field of Classification Search
CPC ..... H04L 67/02; H04L 67/42; H04L 67/2804; H04L 67/2842; H04L 67/1095; G06F 17/30575; G06F 17/30377
See application file for complete search history.

(56) References Cited

U.S. PATENT DOCUMENTS 5,138,189 A    8/1992    Leung et al.
6,253,256 B1    6/2001    Wollrath et al.
(Continued)

OTHER PUBLICATIONS

Forst, et al., "Ajax at Work: Healthcare Provider's Dashboard," http://www.micsymposium.org/mics_2007/Forst1.pdf, Retrieved on: Jan. 6, 2017, 10 pages.
(Continued)

*Primary Examiner* — Dhairya A Patel
(74) *Attorney, Agent, or Firm* — Fiala & Weaver P.L.L.C.

(57) ABSTRACT

A system is provided for synchronizing a property value between a proxy of an application of a client and a corresponding remote object of a server. The application instantiates a proxy of a proxy class corresponding to a remote object of a remote object class where the proxy class specifies a property with a proxy getter. The application sends to the server an invocation request message to invoke a remote object member function of a remote object and receives an invocation response message. When the invocation response message includes a property update, the application extracts from the invocation response message the value of the property from the property update and stores the extracted value in the proxy. When the proxy getter for the property is invoked, the value of the property can be retrieved from the proxy without having to send an invocation request message to the server.

20 Claims, 17 Drawing Sheets

(51) Int. Cl.
*H04L 29/06* (2006.01)
*G06F 16/27* (2019.01)
*G06F 16/23* (2019.01)
*G06F 9/54* (2006.01)

(52) U.S. Cl.
CPC .......... *G06F 16/2379* (2019.01); *G06F 16/27* (2019.01); *H04L 67/02* (2013.01); *H04L 67/1095* (2013.01); *H04L 67/2842* (2013.01); *H04L 67/42* (2013.01)

(56) References Cited

U.S. PATENT DOCUMENTS

| | | | |
|---|---|---|---|
| 6,769,123 | B1 | 7/2004 | Chan |
| 8,266,202 | B1 | 9/2012 | Colton et al. |
| 8,332,818 | B1* | 12/2012 | Haugh ................ G06F 11/3664 717/124 |
| 9,503,501 | B2 | 11/2016 | Toussaint et al. |
| 10,223,181 | B2* | 3/2019 | Lahman ................ G06F 9/548 |
| 2003/0009476 | A1* | 1/2003 | Fomenko ................ H04L 67/28 |
| 2003/0115379 | A1* | 6/2003 | Burton ................ G06F 9/548 719/330 |
| 2004/0210909 | A1* | 10/2004 | Dominguez, Jr. ...... H04L 29/06 719/316 |
| 2014/0289195 | A1 | 9/2014 | Chan et al. |
| 2015/0081774 | A1* | 3/2015 | Wason ................ H04L 67/40 709/203 |
| 2018/0217886 | A1* | 8/2018 | Lahman ................ H04L 67/025 |

OTHER PUBLICATIONS

"dojo/DeferredList," http://web.archive.org/web/20130612050036/http://dojotoolkit.org/reference-guide/1.9/dojo/DeferredList.html, Published on: Jun. 12, 2013, 6 pages.

"ProtoBuf.Rpc.js: Lightweight RPC for JavaScript using Protocol Buffers," https://www.npmjs.com/package/protobuf-rpc, Retrieved on: Jan. 6, 2017, 21 pages.

"Synchronous and asynchronous requests," https://developer.mozilla.org/en-US/docs/Web/API/XMLHttpRequest/Synchronous_and_Asynchronous_Requests, Retrieved on: Jan. 6, 2017, 7 pages.

Eldeeb, et al., "Transactions for Distributed Actors in the Cloud," In Technical report- MSR-TR-2016-1001, Oct. 31, 2016, pp. 1-12.

"Object storage", Retrieved From «https://en.wikipedia.org/w/index.php?title=object_storeage&oldid=760637203», Jan. 18, 2017, 9 Pages.

"DataTrigger.Setters Property", Retrieved From «https://msdn.microsoft.com/en-us/library/system.windows.datatrigger.setters(v=vs.100).aspx», Apr. 12, 2010, 3 Pages.

Eberhard, et al., "Efficient Object Caching for Distributed Java RMI Applications", In IFIP/ACM International Conference on Distributed Systems Platforms and Open Distributed Processing, Nov. 12, 2001, 21 Pages.

"International Search Report & Written Opinion for PCT Application No. PCT/US2017/068064", dated Mar. 29, 2018, 14 Pages.

* cited by examiner

SYNCHRONIZATION OF PROPERTY VALUES BETWEEN A CLIENT AND A SERVER

This application is concurrently being filed as related U.S. application Ser. No. 15/419,964, entitled "DEFERRING INVOCATION REQUESTS FOR REMOTE OBJECTS," and U.S. application Ser. No. 15/420,001, entitled "OBJECT-ORIENTED REMOTE PROCEDURE CALLS FOR BROWSER APPLICATIONS," both of which are herein incorporated by reference in their entireties.

BACKGROUND

Cloud-based services are often provided via applications that are executed via a web browser. To develop such an application, a programmer may develop an application that is to be executed by a web browser of a client and that accesses services of a server of a cloud data center. The application (or client code) typically provides a user interface through which a user can access features of the application. For example, if the application is a word processor, then the application displays content of a document being edited, a menu bar for accessing features of the word processor (e.g., open document and insert footnote), and so on. The document that is being edited is stored on the server. Thus, when the user requests to open the document, the application sends an open request to the server and receives a copy of at least a portion of the document. The application displays content of the document. When a user makes a change to the document, the application may update the displayed content and send a message to the server. The server then changes the document. The communications between the client and the server typically are based on Representational State Transfer ("REST") or RESTful model such as Hypertext Transport Protocol ("HTTP") request messages (e.g., a GET method) and response messages.

Such applications are typically written in JavaScript because most browsers support the execution of JavaScript applications. The server code, in contrast, is typically written in programming languages other than JavaScript, such as C# or C++, for efficiency reasons because JavaScript is an interpreted language and C# and C++ are compiled in executables. JavaScript and C# and C++ are object-oriented programming languages. An object-oriented programming language supports a programming model in which the program specifies classes that define the types of objects that can be instantiated. A class defines the data members and methods (also referred to as member functions) for the objects of that class. Each method has a signature that specifies the name of the method, the types of input parameters to be passed to the method, and the types of output parameters to be returned by the method. For example, a document class may be defined to include methods for opening a document, modifying the document, and saving the document. During execution of an application, after an object of a certain class is instantiated, the application can invoke a method of the object by specifying a reference to the object, an indication of the method to invoke, and the input parameters (if any) to be passed to the method. When the method completes, the method returns the output parameters (if any).

Such applications have historically accessed services of a server using a web service interface that is defined by a Web Services Description Language ("WSDL") or using some other type of a remote procedure call ("RPC") mechanism. Unfortunately, there is little support for object-oriented RPCs, also referred to as remote method invocations ("RMIs"), from such applications to servers. As a result, such applications often do not use an object-oriented approach when accessing objects hosted by a server.

SUMMARY

A system is provided for an application executed by a client to invoke a remote object method of a remote object of a remote object class that is hosted by a server. The application instantiates a proxy of a proxy class that includes a proxy member function with the same signature as the remote object member function. The application associates an object identifier with the proxy. The application invokes the proxy member function of the proxy. Under control of the invoked proxy member function, the application sends to the server an invocation request message that includes the object identifier that is associated with the proxy and an identifier of the remote object member function. The application relies on functionality provided by the browser without the need for the browser to access add-on functionality when executing the application.

A system is provided for synchronizing a property value between a proxy of an application of a client and a corresponding remote object of a server. The application instantiates a proxy of a proxy class corresponding to a remote object of a remote object class where the proxy class specifies a property with a proxy getter. The application sends to the server an invocation request message to invoke a remote object member function of a remote object and receives an invocation response message. When the invocation response message includes a property update, the application extracts from the invocation response message the value of the property from the property update and stores the extracted value in the proxy. When the proxy getter for the property is invoked, the value of the property can be retrieved from the proxy without having to send an invocation request message to the server.

A system is provided for an application executing at a client to send invocation requests to remote objects of a server. Each invocation request is generated when the application invokes a proxy of a proxy class of the application corresponding to a remote object of a remote object class. For each invocation request, when the invocation request is deferrable, the system stores the invocation request. When the invocation request is not deferrable, the system sends to the server an invocation request message that includes each stored invocation request not previously sent and the current invocation request. The system receives invocation response messages from the server. For each invocation response of a received invocation response message, the system provides to the application an indication that the invocation response has been received.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
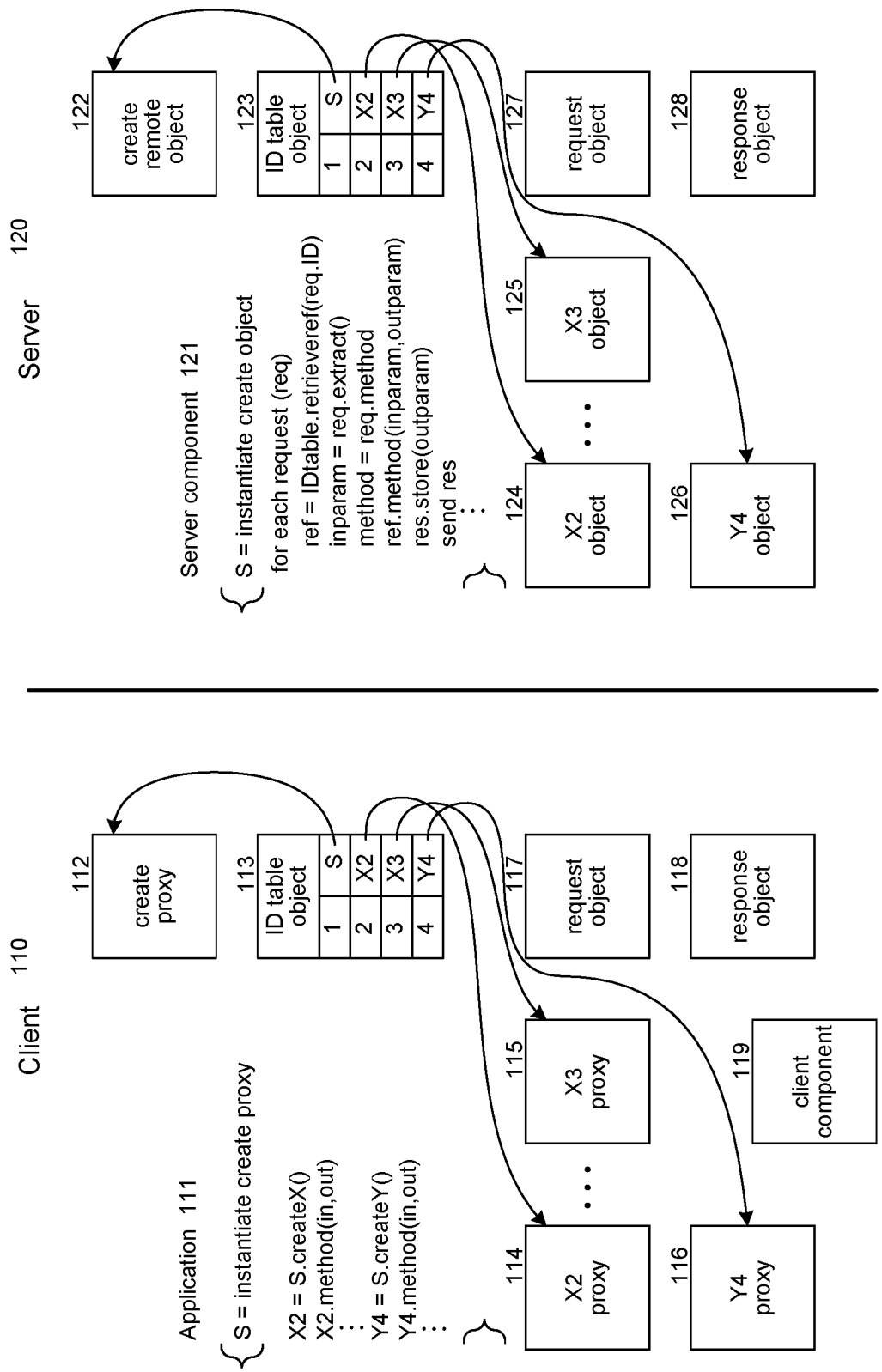
FIG. 1 is a block diagram that illustrates data structures of an application and server component in some embodiments.

A method and system is provided for automatically generating code for an application executed by a client to access objects that are hosted remotely by a server or other remote device in an object-oriented manner. The term "client" refers to a computing device, and the term "server" refers to a computing device. In some embodiments, an Object-Oriented Remote Procedure Call ("OORPC") system inputs a definition of the interfaces for the remote object classes for objects that are hosted remotely by the server ("remote objects"). For each remote object class, the OORPC system automatically generates a proxy class that serves as a proxy for the remote object class. A "proxy" is an object whose methods primarily send invocation request messages to the server that hosts the corresponding remote object. There is typically a one-to-one correspondence between a proxy and a remote object. The proxy class has the same interface (e.g., the same methods and method signatures) as the corresponding remote object class, but with code that is different from the code of the remote object class. For each method of the proxy class, the OORPC system generates code for that method that, when invoked, sends an invocation request message to the server that hosts a remote object corresponding to the proxy of the proxy class. The invocation request message identifies the remote object, the method, and any input parameters passed to the method. The OORPC system also generates code for the method that, after an invocation response message is received from the remote device, returns from the invocation of the method with any output parameters that were identified in the invocation response message. Alternatively, if the invocation of a method is an asynchronous invocation, the OORPC system includes a client component to process the invocation response message that may not be part of the method, but rather part of a callback method that is to be invoked to signal the application that the execution of the method has completed.

In some embodiments, the OORPC system provides a client component for the application that maps each proxy to its corresponding remote object. The application may have a create proxy corresponding to a create remote object that is used to instantiate remote objects. Each method of the create proxy may be invoked to instantiate a remote object of a certain remote object class. Each method sends an invocation request message to a server component, referred to as a "stub," to invoke the corresponding method on the create remote object to instantiate a remote object of the remote object class. Each method also instantiates a proxy for the remote object and returns a reference to the proxy. For example, the create proxy may have a create document method that sends an invocation request message to the server component requesting invocation of the create document method of the create remote object to instantiate a document remote object. The instantiated document remote object may be assigned an object identifier (by either the application or the server code). The create document method of the create proxy also instantiates a document proxy corresponding to the document remote object and maps a reference to the document proxy (e.g., address of the document proxy) to the object identifier. The create document method of the create proxy then returns the reference to the document proxy. When the application subsequently invokes a method of the document proxy as indicated by the reference, that method uses its reference to retrieve the object identifier of the document remote object. That method then sends to the server component an invocation request message as described above that includes the object identifier to identify the document remote object to the server component.

When the server component receives an invocation request message, the server component extracts from the invocation request message the object identifier, the method identifier, and any input parameters. The server component retrieves a reference to the remote object that is identified by the object identifier and invokes the identified method passing the input parameters. When the method returns, the server component sends an invocation response message to the client that includes the object identifier, the method identifier, and any output parameters.

In some embodiments, the create proxy and the create remote object are instantiated during initialization of the application and the server component, respectively, independently of the other. That is, the application instantiates the create proxy without communicating with the server component, and the server component instantiates the create remote object without communicating with the application. The application and the server component both assign the same object identifier (e.g., predefined) to identify the create proxy and the create remote object so that when the application invokes a method of the create proxy, the invocation request message that is sent to the server includes the object identifier of the create remote object. After the server component invokes a method of the create remote object, the server component is returned a reference to the newly created remote object. The server component then generates an object identifier for the newly created remote object, maps the object identifier to the reference, and sends an invocation response message that includes the object identifier and the method identifier of the method that was invoked. When the application receives the invocation response message, the application maps the object identifier to the reference to the corresponding proxy. In this way, when a method of the corresponding proxy is subsequently invoked, the method can include the object identifier of the remote object in the invocation request message.

In some embodiments, the OORPC system may not send invocation requests until a send invocation request message criterion is satisfied. When the send invocation request message criterion is satisfied, the OORPC system sends an invocation request message that includes each invocation request that has not yet been sent. For example, the methods of the proxy classes may be designated as deferrable or not deferrable (e.g., via metadata associated with the interface for the remote object class). When the application invokes a method that is deferrable, the OORPC system generates an invocation request that includes the object identifier, the method identifier, and any input parameters and queues the invocation request. When the application invokes a method that is not deferrable, the OORPC system sends an invocation request message that includes the queued invocation requests and an invocation request for the current invocation. The send invocation request message criterion may be satisfied when a non-deferrable method is invoked. The send invocation request message may similarly be satisfied when an invocation request has been queued for a certain period, when a certain number of invocation requests are queued, when the application directs that the invocation request message be sent, and/or so on.

When the server component receives an invocation request message with multiple invocation requests, the server component processes the invocation requests in the order in which they were queued. After completion of the invocation requests, the server component sends an invocation response message that includes an invocation response for each invocation request of the invocation request message. When the application receives the invocation response message, it processes the invocation responses in order of their corresponding invocation requests.

In some embodiments, the OORPC system provides support for storing values of properties of remote objects locally at a client. When the OORPC system generates a proxy class for a remote object class, the OORPC system generates getter methods ("getters") for properties differently from other methods. The OORPC system generates a getter method that, rather than sending an invocation request message to the server to retrieve the value of the property, retrieves a locally stored value for the property and returns the value. To ensure that the locally stored value for a property of a proxy is synchronized with the value stored by the corresponding remote object, the server component may append to each invocation response message a property update for each property of a remote object whose value has changed since the last invocation response message was sent. The server component may maintain a list of the values that were last sent for each property, and when sending an invocation response message, it may invoke the getter method for each property of each remote object to identify the values that have changed.

When the application receives an invocation response message with a property update, the application stores the new value of the property update in the corresponding proxy. When the OORPC system generates the proxy classes from the interfaces of the remote object classes, the OORPC system may generate a store class for each proxy class. The store class may include a table that maps an identifier of each property (e.g., hash of the property name) to the type of the property (e.g., integer) and a method of the store class for storing the value for that property. The OORPC system may add to a proxy class a static data member that is a reference to a store object that is an instance store class for that proxy class. When the OORPC system receives a new value for a property, it retrieves from the property update in the invocation response message the object identifier of the remote object, the identifier of the property, and the value of the property. The OORPC system uses the object identifier to retrieve the reference to the corresponding proxy and retrieves from that proxy the reference to the store object. The OORPC system then invokes the store method of the store object corresponding to the property passing the reference to the proxy and the value. The store method stores the value in the proxy.

FIG. 1 is a block diagram that illustrates data structures of an application and server component in some embodiments. A client 110 executes an application 111, and a server 120 executes a server component 121. The application and the server component are represented as pseudocode. During initialization, a client component 119 of the OORPC system executing at the client may instantiate an ID table object 113, and the server component, which is a component of the OORPC system, may instantiate an ID table object 123. The ID table objects provide methods for storing and retrieving mappings of object identifiers of proxies and remote objects to their corresponding references in an ID table of the ID table objects. The application instantiates a create proxy 112, and the server component instantiates a corresponding create remote object 122. The client component adds to the ID table object 113 a mapping of an object identifier (e.g., 1) for the create proxy to a reference to (e.g., address of) the create proxy ("S"), and the server component adds to the ID table object 123 a mapping of an object identifier for the create remote object to a reference to the create remote object. The server component then waits to receive invocation requests from the client. The object identifier for a proxy of the client and the object identifier for the corresponding remote object of the server have the same value.

To create a remote object of a remote object class, the application invokes a method of the create proxy for creating remote objects of the remote object class. For example, if a remote object class is named "X," the application may invoke a createX method of the create proxy to create a remote object of the remote object class X. The createX method of the create proxy sends to the server an invocation request message ("req") that includes an object identifier of the create remote object ("req.ID"), a method identifier of the createX method ("req.method"), and any input parameters ("req.inparam"). The client component may instantiate a request object 117 to store the data of an invocation request message to be sent and a response object 118 to store the data of an invocation response message that is received. Similarly, the server component may instantiate a request object 127 to store the data of an invocation request message that is received and a response object 128 to store the data of an invocation response message to be sent.

Upon receiving the invocation request message, the server component extracts the object identifier from the invocation request message and invokes a retrieve reference method ("retrieveref") of its ID table object passing the object identifier to retrieve a reference to the create remote object. The server component then invokes an extract method ("extract") of the request object to extract any input parameters ("inparam"). The server component then extracts from the request object the method identifier of the createX method. The server component then uses the reference to the create remote object and the identifier of the createX method to invoke the createX method of the create remote object passing the input parameters. The createX method instantiates a remote object 124 ("X2 object") of class X and returns an output parameter that is a reference to the remote object 124. Although not illustrated by the pseudocode, the server component also invokes an add entry method of the ID table object 123 to add to its ID table an entry that maps the object identifier ("2") for the remote object 124 to the reference for the remote object 124 ("X2") and adds to a response object ("res") the object identifier ("res.ID") and the identifier of the createX method ("res.method"). The server component then invokes a store method ("store") of the response object to store any output parameters. The server component then sends to the client an invocation response message based on the response object.

Upon receiving the invocation response message, the client component instantiates a response object based on the invocation response message. The client component then instantiates a proxy 114 ("X2 proxy") and invokes an add entry method of the ID table object 113 to add to its ID table a mapping of the object identifier ("2") for the proxy 114 to the reference for the proxy 114 ("X2"). If the invocation of the createX method was synchronous, then the createX method returns with the reference to the proxy 114.

After the remote object 124 and its corresponding proxy 114 are instantiated, the application then invokes a method of the proxy 114 passing an indication of an input parameter ("in"). The invoked method may invoke the client component to generate a request object that includes the object identifier of the proxy 114 ("2"), a method identifier, and the input parameter and to send to the server an invocation request message based on the request object. Upon receiving the invocation response message, the server component retrieves the reference for the remote object 124 from the ID table object and invokes the identified method of the remote object 124 passing the input parameter. When the method returns, the server component generates a response object that includes the object identifier of the remote object 124 ("2"), the method identifier, and any output parameters. The server component then sends to the client an invocation response message based on the response object. Upon receiving the invocation response message, the client component extracts the output parameters and signals that the method has returned to affect a synchronous or asynchronous invocation processing.

The application may then invoke the createX method and the createY method of the create proxy to effect creation of the remote object 125 ("X3 object") and the remote object 126 ("Y4 object") at the server and the corresponding proxy 115 ("X3 proxy") and the corresponding proxy 116 ("Y4 proxy") at the client. The application can then invoke methods of the remote object 125 and the remote object 126 by invoking the corresponding methods of the proxy 115 and the proxy 116.

The computing systems (e.g., clients, servers, client devices, server devices) on which the OORPC system may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The computing systems may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the OORPC system. The data transmission media are used for transmitting data via transitory, propagating signals or carrier waves (e.g., electromagnetism) via a wired or wireless connection.

The OORPC system may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various embodiments. Aspects of the OORPC system may be implemented in hardware using, for example, an application-specific integrated circuit (ASIC).

Figure 2:
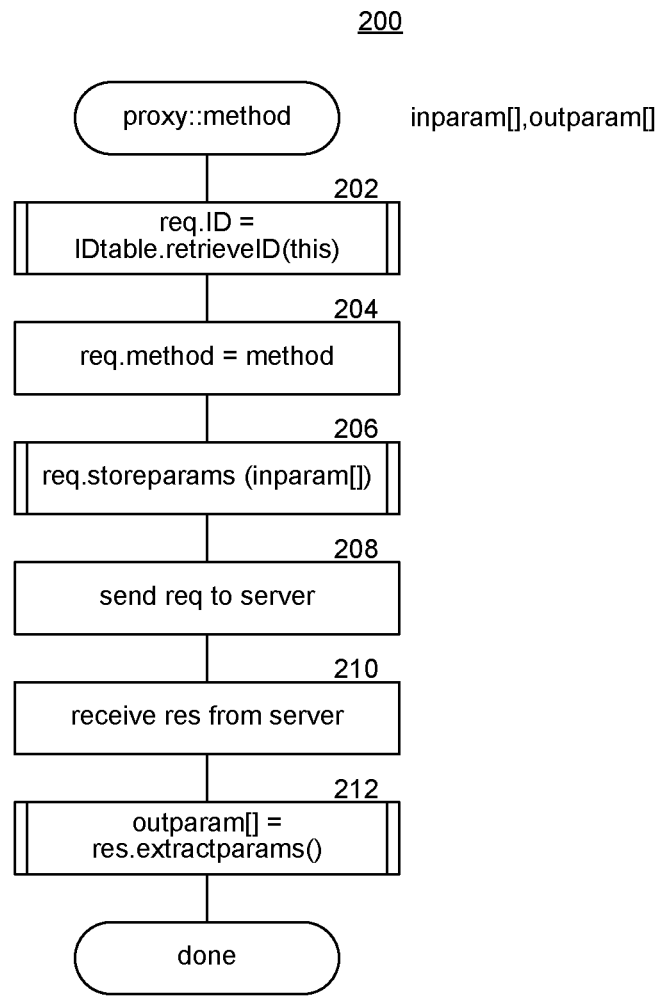
FIG. 2 is a flow diagram that illustrates the processing of a method of a proxy that is synchronously invoked in some embodiments.

FIG. 2 is a flow diagram that illustrates the processing of a method of a proxy that is synchronously invoked in some embodiments. A method 200, which is automatically generated by a code generator of the OORPC system, is passed one or more input parameters and returns one or more output parameters. The method sends to the server an invocation request message and receives an invocation response message. In block 202, the method invokes a retrieve identifier method of the ID table object passing a reference to the proxy ("this") to retrieve the object identifier of the proxy. The method stores the object identifier of the proxy in a request object. In block 204, the method adds the method identifier to the request object. In block 206, the method invokes a store parameters method of the request object to store the input parameters. In block 208, the method sends to the server an invocation request message that is based on the request object. In block 210, the method receives from the server an invocation response message and generates a response object. In block 212, the method invokes an extract parameters method of the response object to extract the output parameters. The method then completes. In some embodiments, the method may invoke a client component to perform the processing of blocks 202-212.

Figure 3:
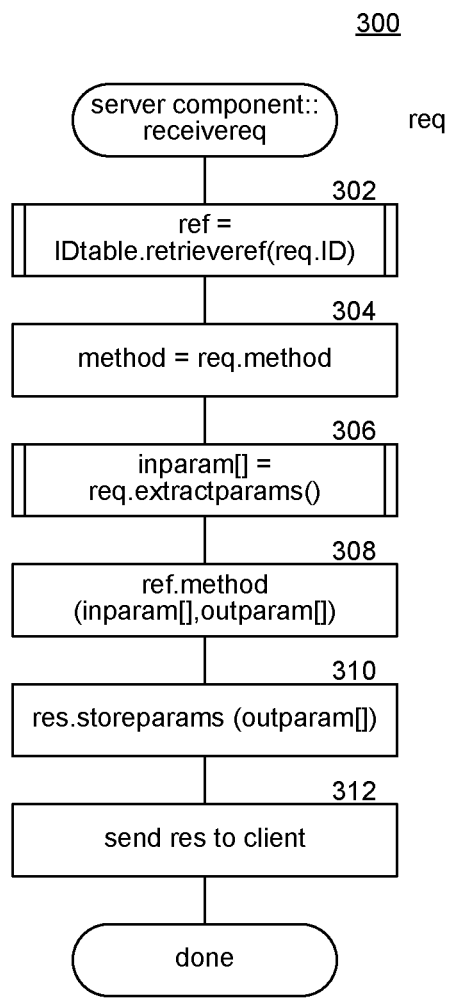
FIG. 3 is a flow diagram that illustrates the processing of a receive request component of a server component in some embodiments.

FIG. 3 is a flow diagram that illustrates processing of a receive request component of a server component in some embodiments. A receive request component 300 is invoked when an invocation request message is received from a client and is passed a request object that is based on the invocation request message. The component invokes a method of a remote object and sends to the client an invocation response message. In block 302, the component extracts the object identifier of a remote object from the request object and invokes a retrieve reference method of the ID table object, passing the object identifier, and receives a reference to the remote object. In block 304, the component extracts the method identifier from the request object. In block 306, the component invokes an extract parameters method of the request object to extract the input parameters. In block 308, the component invokes the identifier method of the remote object, passing the input parameters and receiving any output parameters upon return. In block 310, the component generates a response object that includes the object identifier, the method identifier, and output parameters. In block 312, the component sends to the client an invocation response message that is based on the response object and then completes.

Figure 4:
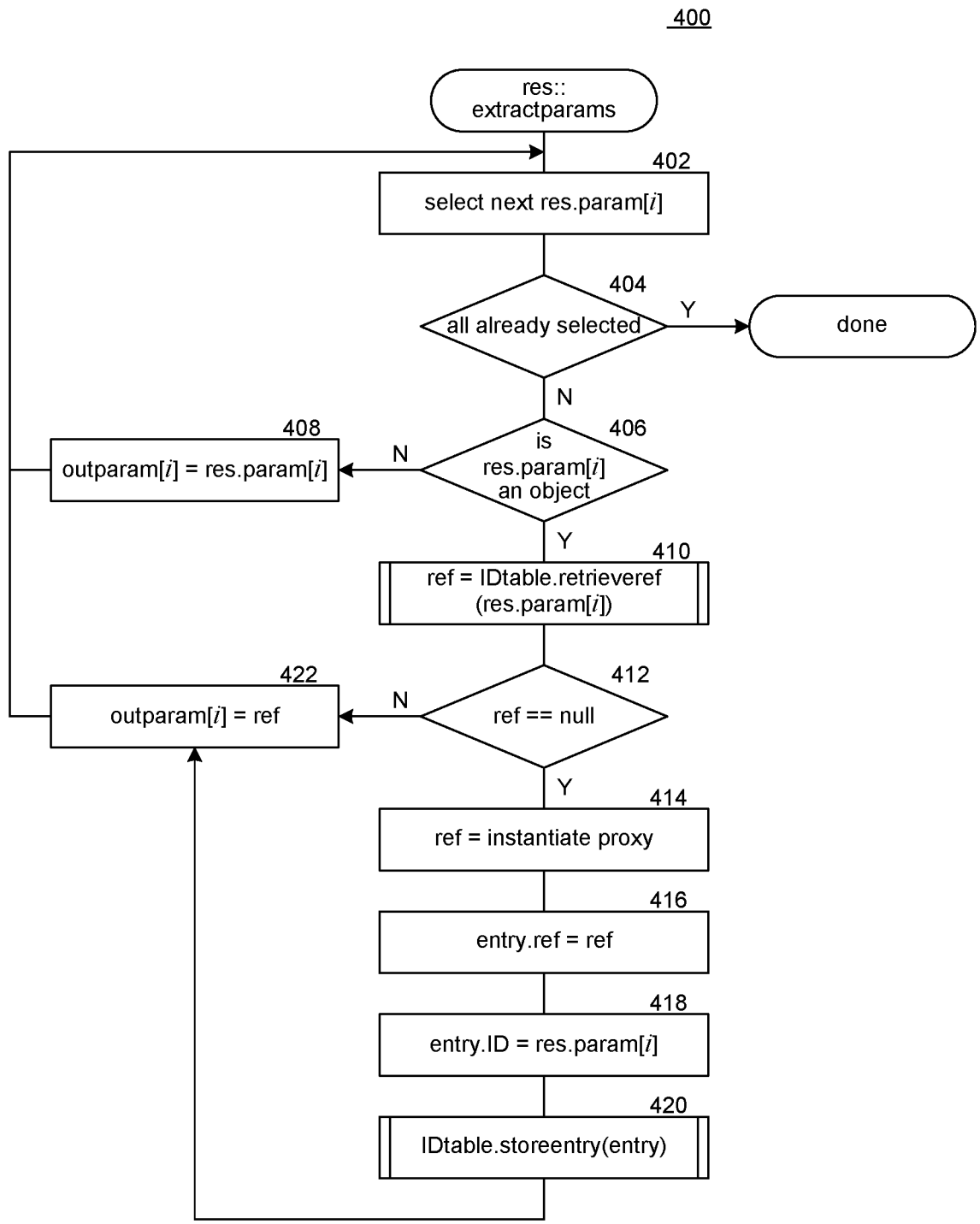
FIG. 4 is a flow diagram that illustrates the processing of an extract parameters method of a response object class for a response object of a client component in some embodiments.

FIG. 4 is a flow diagram that illustrates the processing of an extract parameters method of a response object class for a response object of a client component in some embodiments. An extract parameters method 400 is invoked by a client component to extract the output parameters returned by an invoked method. In block 402, the method selects the next output parameter starting with the first. In decision block 404, if all the output parameters have already been selected, then the method completes, else the method continues at block 406. In decision block 406, if the selected output parameter is an identifier of a remote object, then the method continues at block 410, else the method continues at block 408. In block 408, the component stores the selected output parameter as an output parameter and then loops to block 402 to select the next output parameter. In block 410, the method invokes the retrieve reference method of the ID table object to retrieve a reference to the remote object identified in the response object. In decision block 412, if the reference is null, then a proxy for the remote object has not been instantiated and the method continues at block 414, else the method continues at block 422. In block 414, the method instantiates a proxy for the class of the remote object. The code generator for the OORPC system can identify the class of the remote object, and more generally the type of any parameter, from the signature of the invoked method. In blocks 416 and 418, the method creates an entry for the ID table. In block 420, the method invokes an add entry method of the ID table object to store the entry and then continues at block 422. In block 422, the component sets the output parameter to the returned reference and then loops to block 402 to select the next output parameter of the response object.

Figure 5:
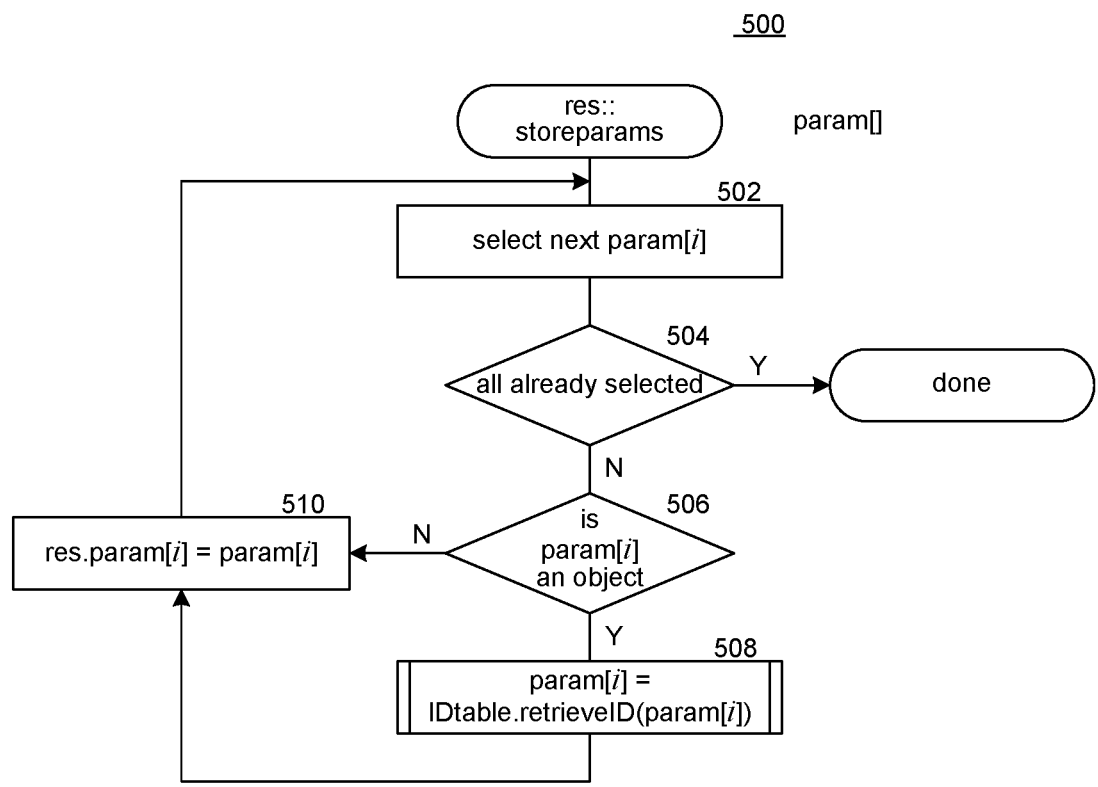
FIG. 5 is a flow diagram that illustrates the processing of a store parameters method of a response object class for a response object of a server component in some embodiments.

FIG. 5 is a flow diagram that illustrates the processing of a store parameters method of a response object class for a response object of a server component in some embodiments. A store parameters method 500 is passed output parameters to be stored in the response object. In block 502, the method selects the next output parameter. In decision block 504, if all the output parameters have already been selected, then the method completes, else the method continues at block 506. In decision block 506, if the output parameter is a reference to an object, then the component continues at block at 508, else the component continues at block 510. In block 508, the component invokes a retrieve ID method of the ID table object to retrieve the object identifier corresponding to the reference and sets the output parameter to the reference. In block 510, the component stores the output parameter in the response object and then loops to block 502 to select the next output parameter. Although not illustrated, a request object also has an extract parameters method and a store parameters method that function in a manner similar to those of a response object.

Figure 6:
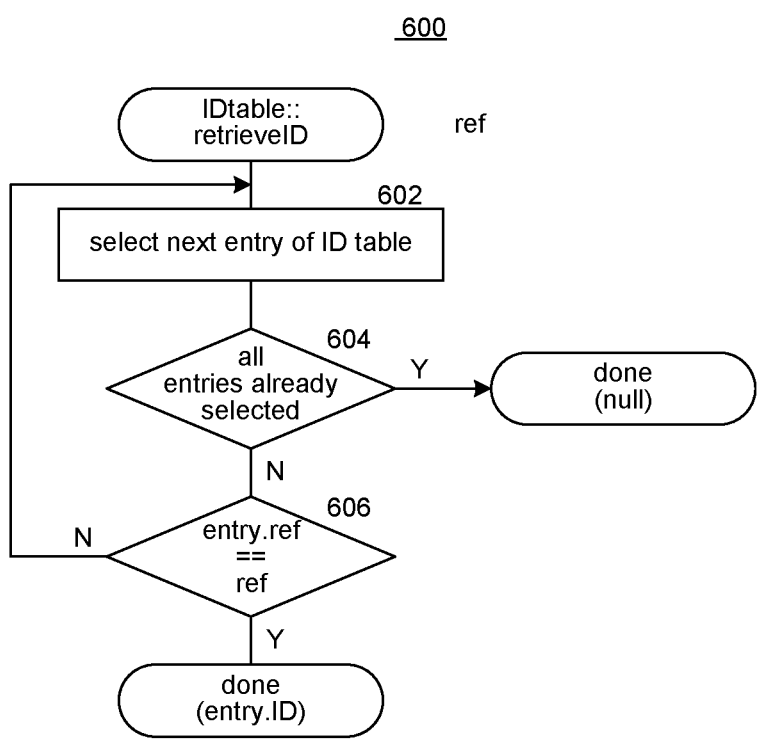
FIG. 6 is a flow diagram illustrating the processing of a retrieve ID method of an ID table object class in some embodiments.

FIGS. 6-9 are flow diagrams illustrating methods of an ID table object class in some embodiments. FIG. 6 is a flow diagram illustrating the processing of a retrieve ID method of an ID table object class in some embodiments. A retrieve ID method 600 is passed a reference to an object and returns the object identifier corresponding to that reference. In block 602, the method selects the next entry of the ID table. In decision block 604, if all the entries have already been selected, then the method returns a null value to indicate that an entry for the reference is not in the ID table, else the method continues at block 606. In decision block 606, if the reference in the selected entry matches the passed reference, then the method returns an indication of the object identifier of that entry, else the method loops to block 602 to select the next entry of the ID table.

Figure 7:
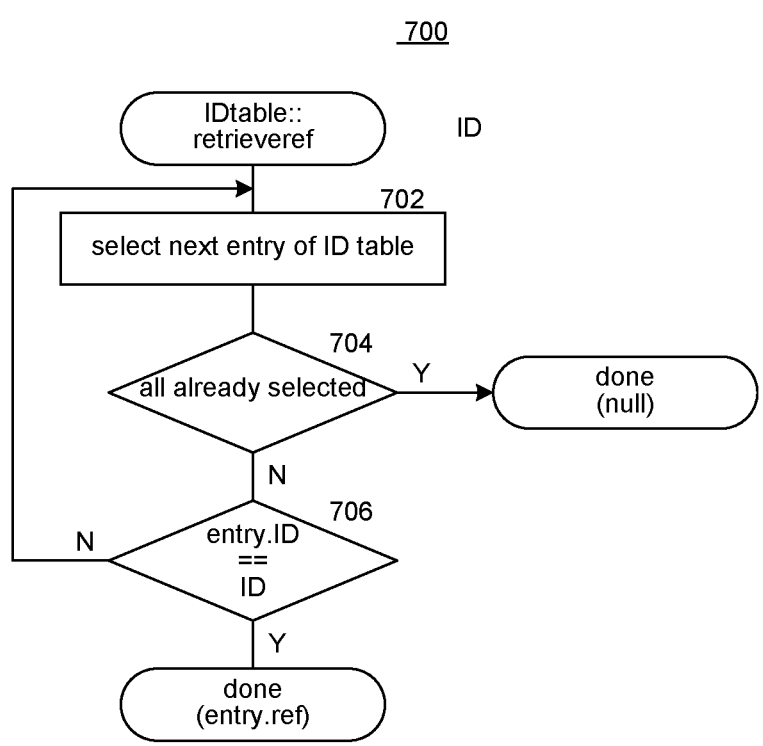
FIG. 7 is a flow diagram that illustrates the processing of a retrieve reference method of an ID table object in some embodiments.

FIG. 7 is a flow diagram that illustrates the processing of a retrieve reference method of an ID table object in some embodiments. A retrieve reference method 700 is passed an object identifier and returns the reference corresponding to that object identifier. In block 702, the method retrieves the next entry of the ID table. In decision block 704, if all the entries have already been selected, then the method returns a null value to indicate that an entry for the object identifier is not in the ID table, else the method continues at block 706. In decision block 706, if the object identifier of the selected entry matches the passed object identifier, then the method returns the reference of the selected entry, else the method loops to block 702 to select the next entry of the ID table.

Figure 8:
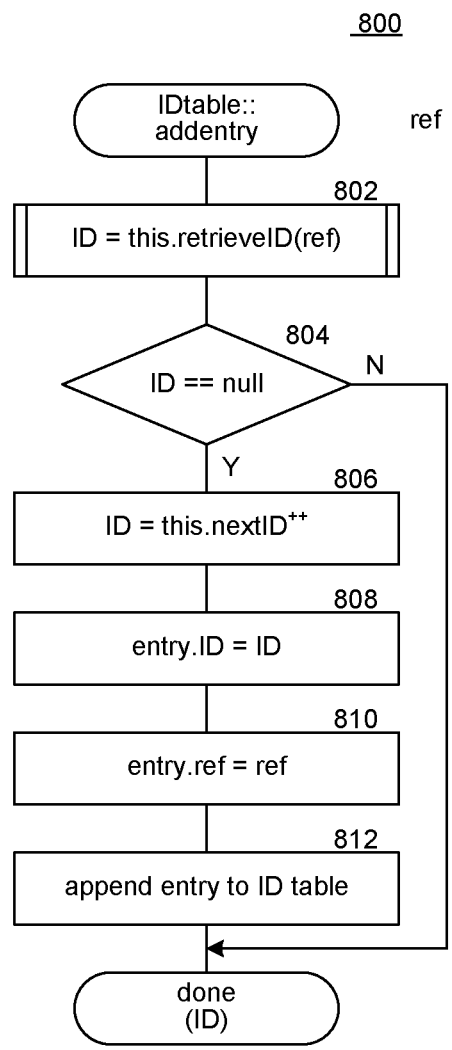
FIG. 8 is a flow diagram that illustrates the processing of an add entry method of an ID table object that is passed a reference in some embodiments.

FIG. 8 is a flow diagram that illustrates the processing of an add entry method of an ID table object that is passed a reference in some embodiments. An add entry method 800 is passed a reference to an object (i.e., proxy or remote object) and adds an entry to the ID table for that reference if the ID table does not already contain an entry for that reference. In block 802, the method invokes the retrieve ID method of this ID table object passing the reference to retrieve the object identifier if the ID table contains an entry corresponding to the reference. In decision block 804, if the returned object identifier is null, then the ID table does not contain a corresponding entry and the method continues at block 806, else the method returns the object identifier. In block 806, the method sets the object identifier to a next object identifier field of the ID table object and increments the next object identifier field. In blocks 808-810, the method initializes the entry for the reference. In block 812, the method appends the entry to the ID table and then returns an indication of the object identifier.

Figure 9:
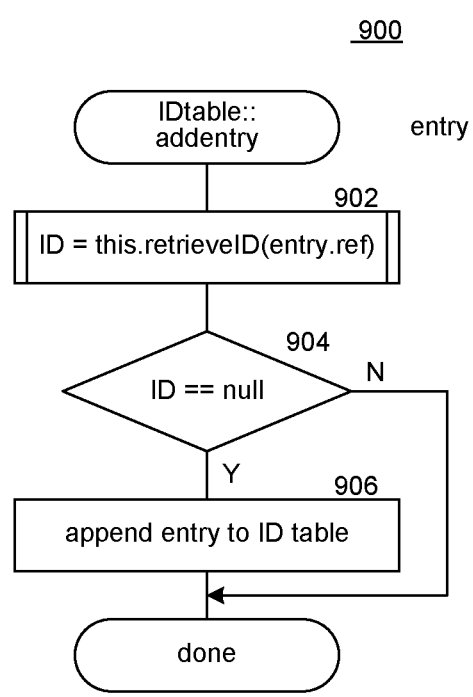
FIG. 9 is a flow diagram that illustrates the processing of an add entry method of an ID table object that is passed an entry in some embodiments.

FIG. 9 is a flow diagram that illustrates the processing of an add entry method of an ID table object that is passed an entry in some embodiments. An add entry method 900 is passed an entry that is to be added to the ID table if the entry is not already in the ID table. In block 902, the method invokes a retrieve ID method of this ID table object passing the reference of the entry. In decision block 904, if the entry is null, then the ID table does not contain that entry and the method continues at block 906, else the method returns. In block 906, the method adds the entry to the ID table and then returns.

In some embodiments, the OORPC system allows both the client and the server to host remote objects that are accessed remotely by the other. The client and the server thus may be considered peers in the sense that both host remote objects. For example, if a document is being processed in a collaborative environment by multiple clients, each client may register an object with the server to receive event notifications of changes to the document. In such a case, a client may invoke a register method of the document proxy passing an event listener object that is instantiated by the client. The client may maintain a proxy ID table for mapping object identifiers to references to proxies for objects hosted remotely at the server and an object ID table that maps object identifiers to references to objects hosted locally by the client. Similarly, the server may maintain a proxy ID table for mapping object identifiers to references to proxies for objects hosted remotely by a client and an object ID table that maps object identifiers to references to objects hosted locally by the server. The register method of the document proxy may add an entry for the event listener object to the object ID table and include the object identifier of the entry as an input parameter in the invocation request message for the register method. When the server receives the invocation request message, the server component may search both the object ID table and proxy ID table for an entry with a matching object identifier. If such an entry is found, the server component replaces the object identifier with the reference of the entry as the input parameter to the register method. If such an entry is not found, the server component instantiates an event listener proxy for the event listener object and adds an entry to the proxy ID table that maps the object identifier to the reference to the event listener object proxy. The server component then invokes the register method of the document remote object passing the reference to the listener proxy. When the server component sends an event to the application, the server code invokes an event method of the listener proxy, which sends to the client an invocation request message. When the client receives the invocation request message, a client component processes the invocation request message in much the same manner as the server component of the server handles invocation request messages. In this way, both the client and the server can invoke methods of remote objects hosted remotely by the other.

In some embodiments, an object method of a remote object may have an input parameter and/or an output parameter that is passed by value. To pass an input parameter by value, the proxy method of the proxy corresponding to the remote object retrieves the value for the input parameter and adds the retrieved value to the invocation request message. If the input parameter is itself a remote object hosted by the server, then the proxy method may send an invocation request message to the server to retrieve the value. Similarly, when returning an output parameter by value, the object method retrieves the value of the output parameter and adds the retrieved value to the invocation response message. In some embodiments, an input parameter or an output parameter may be a data structure containing multiple objects. To pass an input parameter that is such a data structure, the proxy method retrieve the object identifier of each object in the data structure and add each object identifier to the invocation request message. For example, if the data structure is an array, the proxy method for each element of the array, selects the element, retrieves the object identifier of the selected element, and adds the retrieved object identifier to the invocation request message. To pass an output parameter that is an array, the object method processes the elements of the array in a similar manner. The data structure of an input parameter or an output parameter may contain an object hosted on the server and object hosted on the client. When processing such an input parameter, a proxy method adds the object identifier of each object to the invocation request message. Upon receiving, the invocation request message, the server component retrieves the references to the objects from either the object identifier table or the proxy identifier table and invokes the object method passing the retrieved references. The server component may instantiate a corresponding object or proxy if not yet instantiated.

Figure 10:
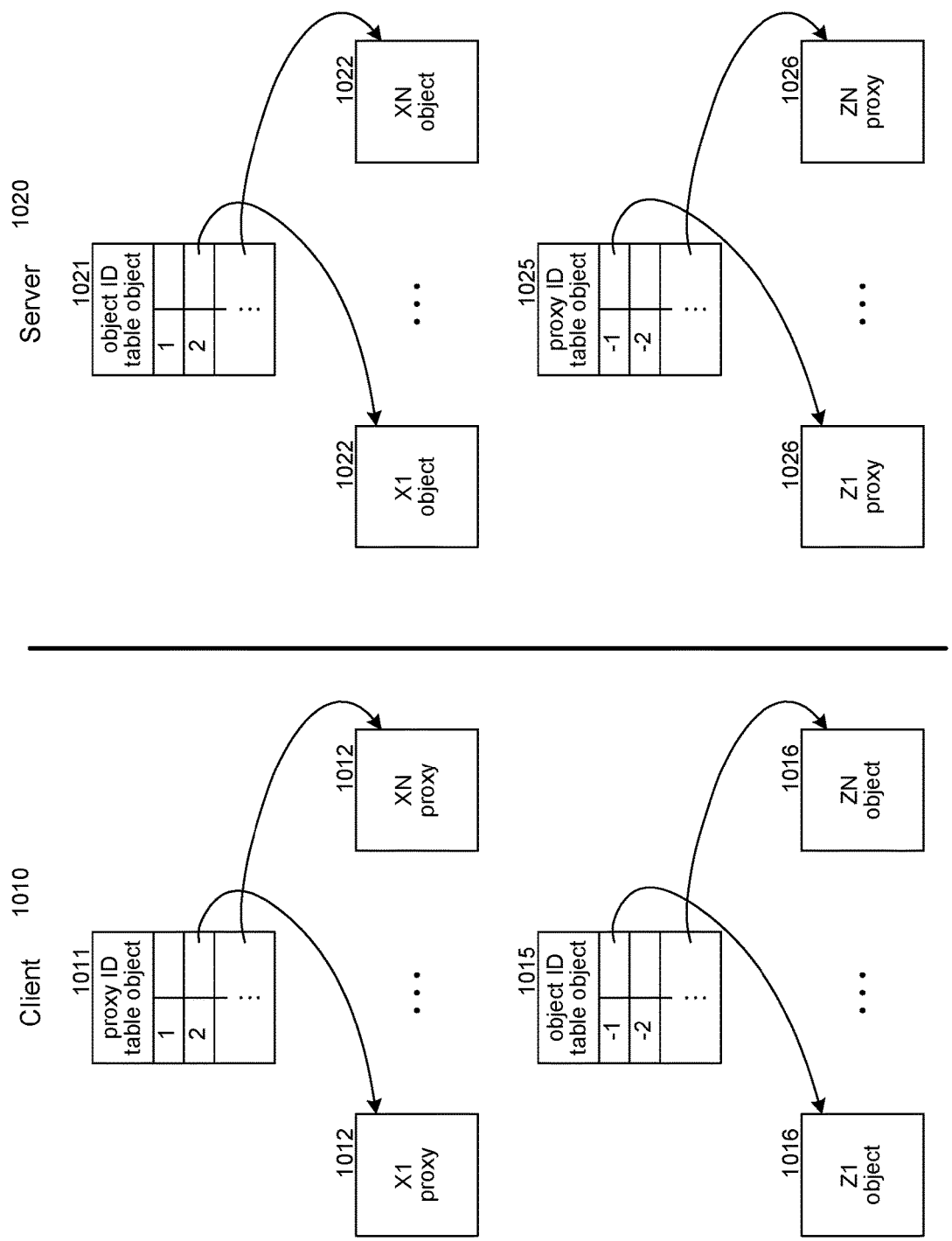
FIG. 10 is a block diagram that illustrates an implementation of the OORPC system that supports peer hosting of remote objects in some embodiments.

FIG. 10 is a block diagram that illustrates an implementation of the OORPC system that supports peer hosting of remote objects in some embodiments. A client 1010 includes a proxy ID table object 1011 and an object ID table object 1015. The proxy ID table object 1011 includes an ID table that contains entries for proxies 1012, and the object ID table object 1015 includes an ID table that contains entries for remote objects 1016. A server 1020 includes an object ID table object 1021 and a proxy ID table object 1025. The object ID table object 1021 includes an ID table that contains an entry for each object 1022, and the proxy ID table object 1025 includes an ID table that contains an entry for each proxy 1026.

Figure 11:
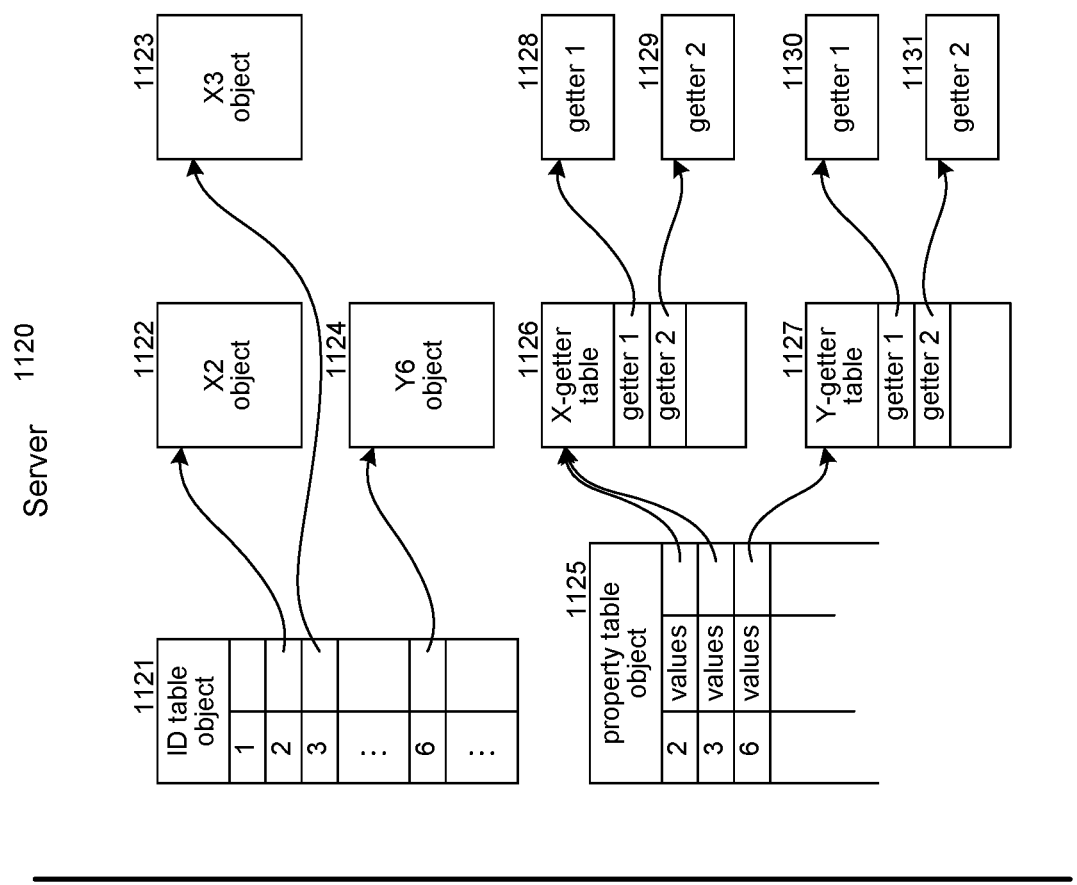
FIG. 11 is a block diagram that illustrates data structures that support synchronization of values of properties by the OORPC system in some embodiments.

FIG. 11 is a block diagram that illustrates data structures that support synchronization of values of properties by the OORPC system in some embodiments. A client 1110 includes an ID table object 1111 with an ID table that includes entries for proxies 1112 and 1113 for remote objects of the remote object class X and that includes an entry for a proxy 1114 for a remote object of the remote object class Y. Each proxy includes a static data member for referencing a store object for its remote object class. Proxies 1112 and 1113 include a reference to a store object 1115 for the remote object class X, and proxy 1114 includes a reference to a store object 1116 for the remote object class Y. The store object for a remote object class may include a method for each getter method of the remote object class that stores a value for a property locally in a proxy. A server 1120 includes an ID table object 1121 with an ID table that includes entries for remote objects 1122 and 1123 of the remote object class X and that includes an entry for an object 1124 of the remote object class Y. The server also includes a property table object 1125 with a property table that includes an entry for each property of each remote object. Each entry includes an object identifier of the remote object, the last retrieved value of each property of the remote object, and a reference to a getter table for the remote object class of the remote object. In some embodiments, each entry may contain a reference to a data structure that stores the last retrieved values for the remote object. Also, the ID table and the property table may be combined into a single table. As illustrated, the first entry of the property table corresponds to the remote object 1122 and includes a pointer to a getter table 1126 for the remote object class X. The getter table 1126 includes an entry for each getter method 1128 and 1129 of the remote object class X. A getter table 1127 includes an entry for each getter method 1130 and 1131 of the remote object class Y. The entries point to code that invokes the corresponding getter method of a remote object to retrieve the value of a property.

Prior to sending a response invocation message, the server component may select each entry of the property table and invoke the getter methods of the remote object of each entry to retrieve the value of each property. If a value of a property returned by a getter method for an object is different from the value for that property that is stored in the property table, the server component adds a property update to the invocation response message. The property update includes the object identifier, a property identifier, and the new value. When the client receives the invocation response message, the client component processes each property update. For each property update, the client component retrieves the reference to the proxy corresponding to the object identifier of the property update. The client component retrieves the reference to the store object from the proxy and invokes the corresponding store method for that property of the store object passing an indication of the reference. The store method then stores the value of the property in the proxy. In some embodiments, each property update may contain the values for all the changed properties of a remote object. That is, the invocation response message contains only one property update for a remote object, rather than a separate property update for each changed property of the remote object.

Figure 12:
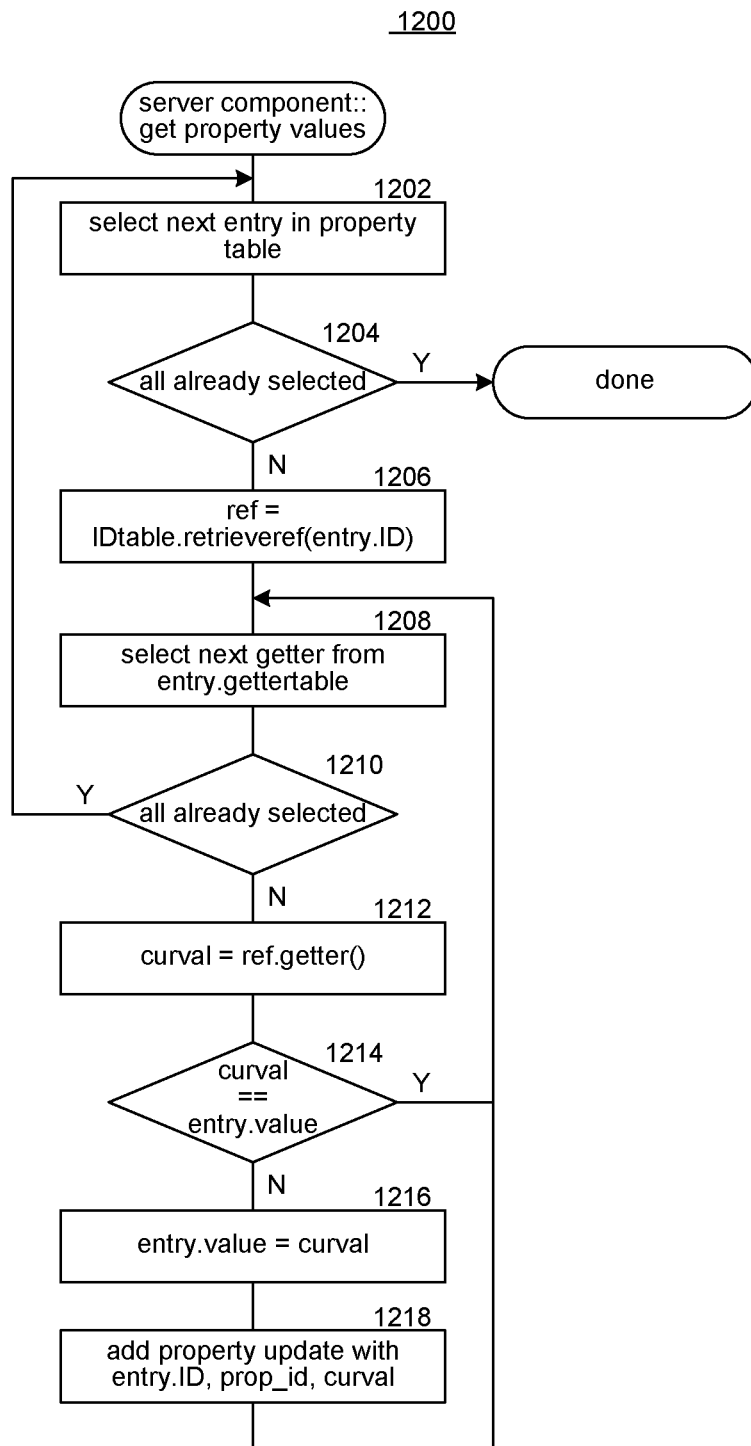
FIG. 12 is a flow diagram that illustrates the processing of a get property values component of a server component in some embodiments.

FIG. 12 is a flow diagram that illustrates the processing of a get property values component of a server component in some embodiments. A get property values component 1200 is invoked to add a property update to an invocation response message for each property of each remote object whose value has changed. In block 1202, the component selects the next entry of the property table. In decision block 1204, if all the entries have already been selected, then the component completes, else the component continues at block 1206. In block 1206, the component invokes the retrieve reference method of the ID table object to retrieve the reference corresponding to the object identifier of the selected entry. In blocks 1208-1218, the component loops processing each property of the referenced remote object. In block 1208, the component selects the next getter method from the getter table referenced by the selected entry. In decision block 1210, if all the getter methods have already been selected, then the component loops to block 1202 to select the next entry in the property table, else the component continues at block 1212. In block 1212, the component invokes the selected getter method of the referenced remote object. In decision block 1214, if the current value of the property is the same as the value in the selected entry for the property, then the component loops to block 1208 to select the next getter method, else the component continues at block 1216. In block 1216, the component sets the value in the entry for the property to the current value. In block 1218, the component adds a property update with the object identifier, the property identifier, and the current value of the property to the invocation response message and then loops to block 1208 to select the next getter method.

Figure 13:
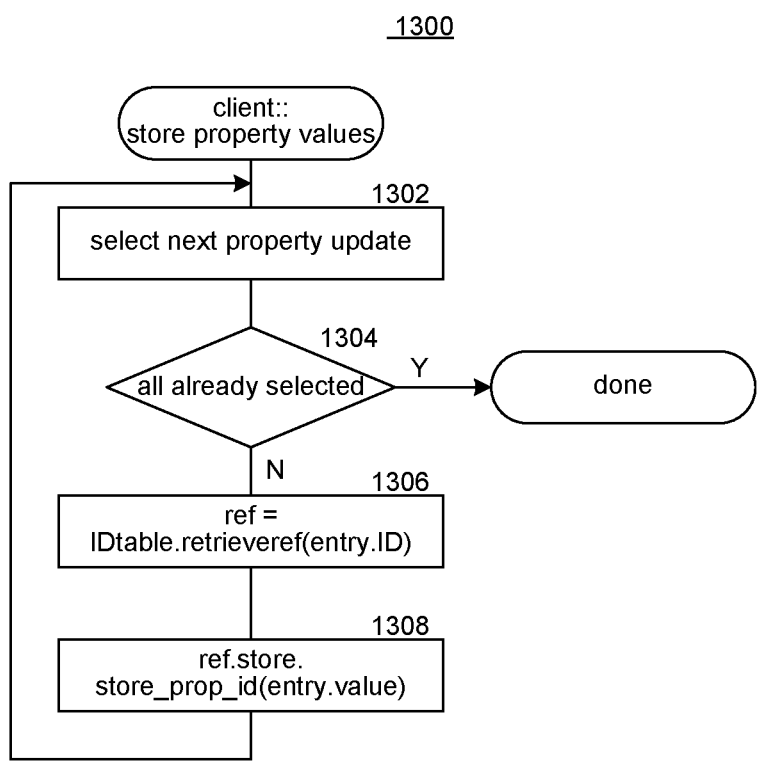
FIG. 13 is a flow diagram that illustrates the processing of a store property values component of a client component in some embodiments.

FIG. 13 is a flow diagram that illustrates the processing of a store property values component of a client component in some embodiments. A store property values component 1300 is invoked when an invocation response message is received that includes property updates and updates the locally stored values for the properties. In block 1302, the component selects the next property update of the invocation response message. In decision block 1304, if all the property updates have already been selected, then the component completes, else the component continues at block 1306. In block 1306, the component invokes the retrieve reference method of the ID table object, passing the object identifier of the selected entry, and receives a reference to the corresponding proxy. In block 1308, the component invokes a store method of the store object referenced by a static data member of the proxy passing the value of the entry. The component then loops to block 1302 to select the next property update entry of the response invocation message. A store object may have a separate store method generated to handle each property. Alternatively, the store object may have a single store method that accesses a table with an entry for each property with information such as type of object and name of property.

Figure 14:
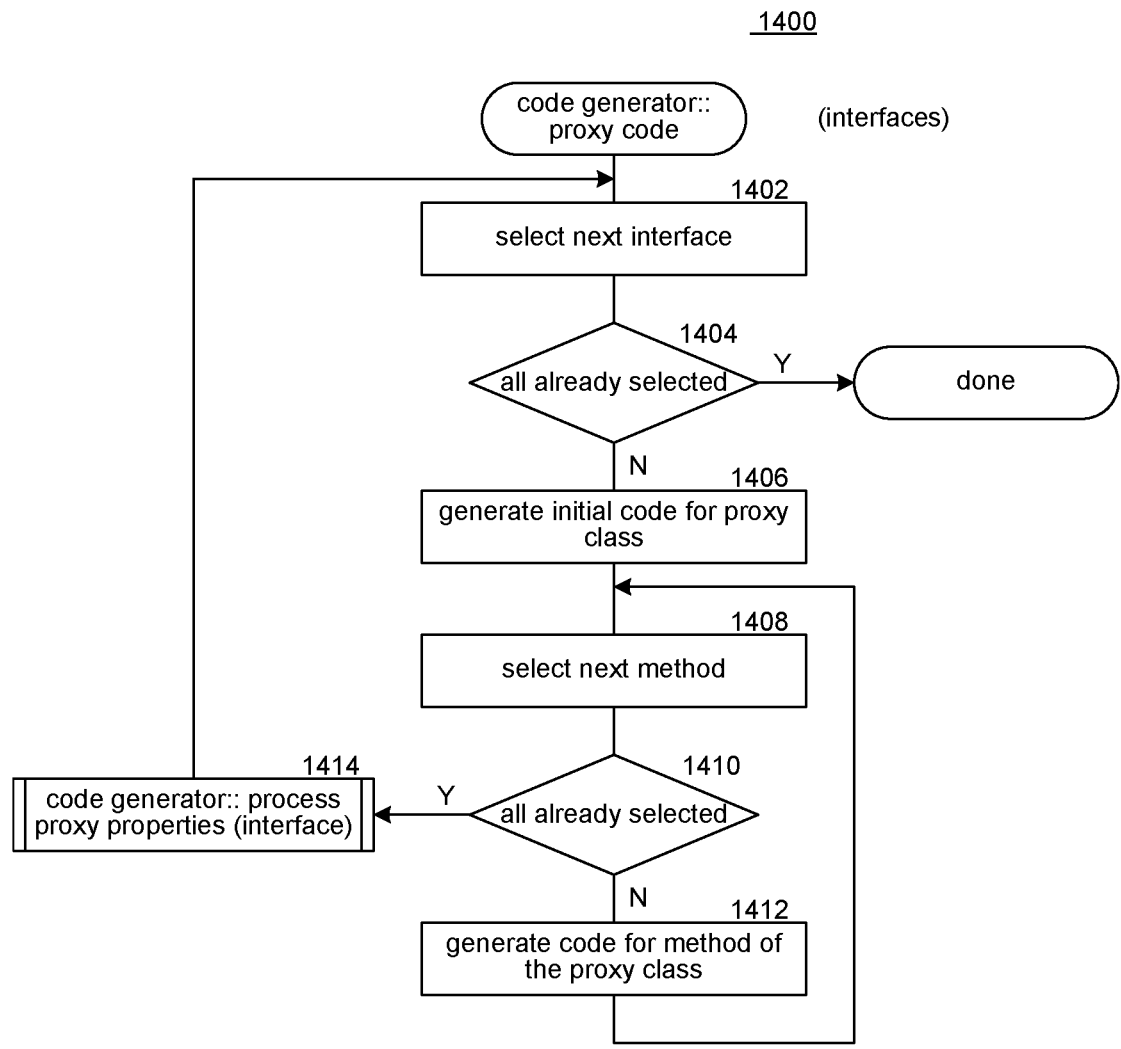
FIG. 14 is a flow diagram that illustrates a code generator of the OORPC system for automatically generating code for proxy classes in some embodiments.

FIG. 14 is a flow diagram that illustrates a code generator of the OORPC system for automatically generating code for proxy classes in some embodiments. A proxy code component 1400 is passed an interface for each class of objects hosted by a server and generates the proxy classes (e.g., JavaScript). In block 1402, the component selects the next interface. In decision block 1404, if all the interfaces have already been selected, then the component completes, else the component continues at block 1406. In block 1406, the component generates initial code for the proxy class, which may include a class template that includes the name of the class, beginning and ending symbols of the class (e.g., parentheses), and so on. In blocks 1408-1412, the component loops processing each method of the interface that is not a getter method. In block 1408, the component selects the next method. In decision block 1410, if all the methods have already been selected, then the component continues at block 1414, else the component continues at block 1412. In block 1412, the component generates code for the selected method of the proxy class and then loops to block 1408 to select the next method. In block 1414, the component invokes a process proxy properties component of the code generator passing an indication of the selected interface to generate code for a store class for the proxy class. The component then loops to block 1402 to select the next interface.

Figure 15:
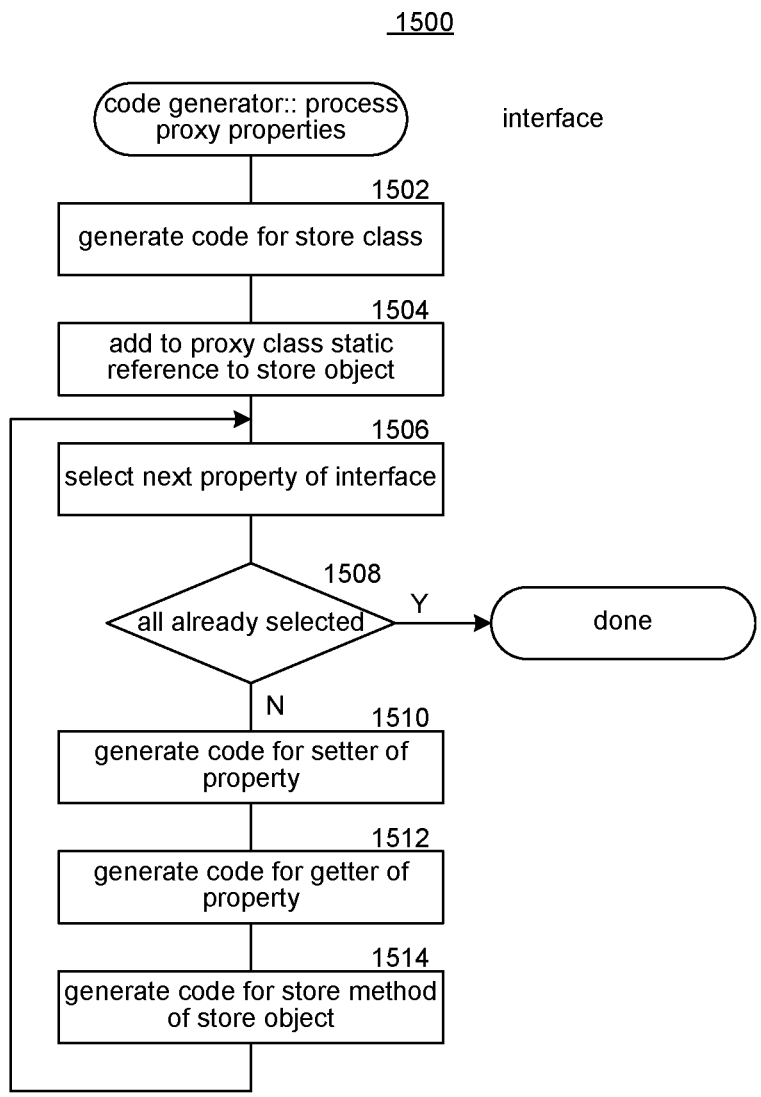
FIG. 15 is a flow diagram that illustrates the processing of a process proxy properties component of the code generator in some embodiments.

FIG. 15 is a flow diagram that illustrates the processing of a process proxy properties component of the code generator in some embodiments. A process proxy properties component 1500 is invoked to generate a store class for a proxy class and add a static data member to the proxy class for storing a reference to a store object for the proxy class. In block 1502, the component generates the initial code for the store class. In block 1504, the component adds to the proxy class a static data member for referencing a store object. In block 1506, the component selects the next property of the interface. In decision block 1508, if all the properties of the interface have already been selected, then the component completes, else the component continues at block 1510. In block 1510, the component generates code for a setter method of the proxy class for the selected property that sends an invocation request message to a server. In block 1512, the component generates code for a getter method of the proxy class for the selected property that retrieves the local value of the property. In block 1514, the component generates code for a store method of the store class for storing in the proxy a value of the selected property that is received in an invocation response message and then loops to block 1506 to select the next property of the interface.

In some embodiments, a code generator of the OORPC system may automatically generate a server component for a server to support invocation of remote objects. The code generator may be provided the interfaces for the remote objects hosted by the server. The code generator generates code to receive from a client an invocation request message and to invoke the identified remote object method of the identified remote object passing the identified input parameter. The code generator also generates code to, after the invoked remote object method returns, send to the client an invocation response message with an object identifier of the remote object, a method identifier of the remote object methods, and an output parameter returned by the invoked remote object method. The code generator may also automatically generate the code that supports the synchronization of property values based on the interfaces.

Figure 16:
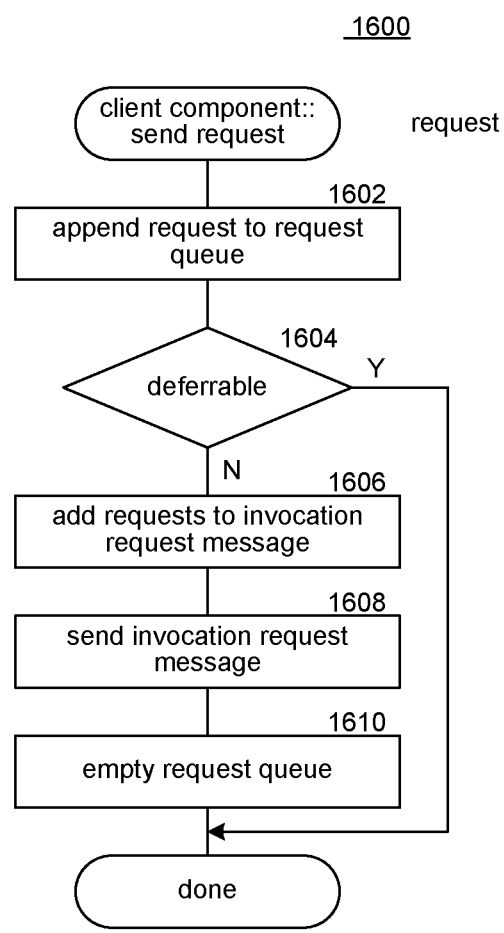
FIG. 16 is a flow diagram that illustrates the processing of a send request component of a client component in some embodiments.
Figure 17:
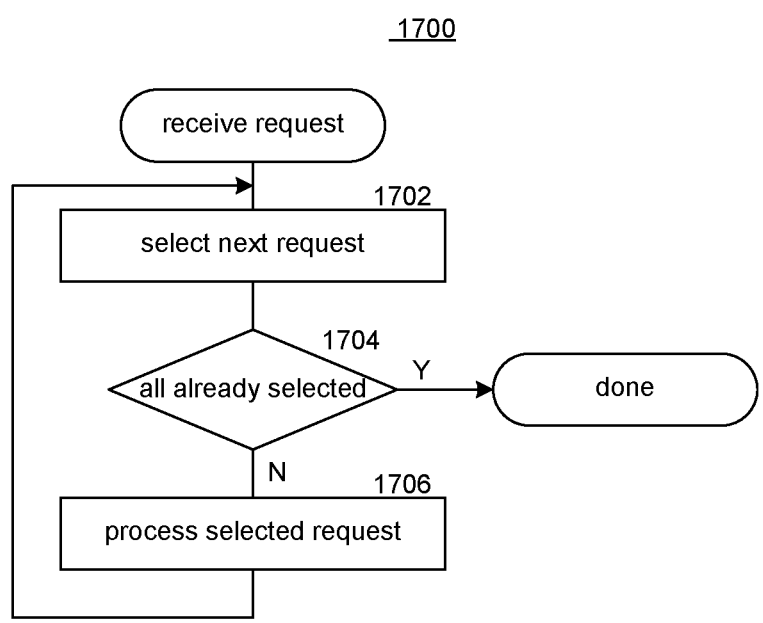
FIG. 17 is a flow diagram that illustrates the processing of a receive request component of a server component in some embodiments.

FIGS. 16 and 17 are flow diagrams that illustrate the deferring of invocation requests in some embodiments. FIG. 16 is a flow diagram that illustrates the processing of a send request component of a client component in some embodiments. A send request component 1600 is invoked passing an invocation request (e.g., via a request object) to invoke a method of a remote object. The component sends to a server an invocation request message with any queued invocation requests when the invocation of the method is not deferrable. In block 1602, the component appends the invocation request to a request queue. In decision block 1604, if the invocation of the method is deferrable, then the component completes, else the component continues at block 1606. In block 1606, the component adds the invocation requests of the invocation request queue to an invocation request message. In block 1608, the component sends to the server the invocation request message. In block 1610, the component empties the request queue and then completes.

FIG. 17 is a flow diagram that illustrates the processing of a receive request component of a server component in some embodiments. A receive request component 1700 is invoked when a server component receives an invocation request message. In block 1702, the component selects the next invocation request of the invocation request message. In decision block 1704, if all the invocation requests have already been selected, then the component completes, else the component continues at block 1706. In block 1706, the component processes the selected invocation request by invoking the method of the remote object identified by the invocation request. The component then loops to block 1702 to select the next invocation request.

The following paragraphs describe various embodiments of aspects of the OORPC system. An implementation of the OORPC system may employ any combination of the embodiments. The processing described below may be performed by a computing device with a processor that executes computer-executable instructions stored on a computer-readable storage medium that implements the OORPC system.

In some embodiments, a method performed by a client is provided for invoking a remote object member function of a remote object of a remote object class where the remote object is hosted by a server. Under control of a browser, the method performs the following. The method retrieves a web page that includes the application. Under control of the application, the method instantiates a proxy of a proxy class where the proxy class includes a proxy member function with a same signature as the remote object member function. The method associates an object identifier with the proxy where the object identifier is for use in identifying the remote object to the server. The method invokes the proxy member function of the proxy object. Under control of the invoked proxy member function, the method sends to the server an invocation request message that includes the object identifier that is associated with the proxy and an identifier of the remote object member function. The application relies on functionality provided by the browser without the need for the browser to access add-on functionality when executing the application. In some embodiments, the method further sends to the server an invocation request message that requests to invoke a member function of a create remote object to instantiate the remote object. In some embodiments, the method further, under control of the application, receives from the server an invocation response message that indicates the remote object has been instantiated. In some embodiments, the invocation response message includes the object identifier that is assigned to the remote object by the server. In some embodiments, the invocation request message includes the object identifier that is assigned to the remote object by the client. In some embodiments, the invocation request message includes an input parameter that is passed to the proxy member function. In some embodiments, the invocation response message includes an output parameter to be returned by the proxy member function. In some embodiments, the proxy is identified by a proxy reference and further comprising associating the proxy reference with the object identifier. In some embodiments, the associating includes adding to an object identifier table an entry that includes the proxy reference and the object identifier. In some embodiments, the remote object class and proxy class are implemented in different programming languages. In some embodiments, the proxy class is automatically generated based on an interface definition for the remote object class, the proxy class including an implementation of the proxy member function. In some embodiments, the invocation of the proxy member function is an asynchronous invocation.

In some embodiments, a method performed by a computing system is provided for generating proxy classes for an application executing at a client to access remote objects of remote object classes hosted by a server The method accesses interfaces of the remote object classes where each interface includes a signature of a remote object member function of the remote class. For each remote object class, the method generates a proxy class for the remote object class. The proxy class includes an proxy member function for each remote object member function of the remote object class. Each proxy member function of the proxy class is generated to, upon invocation of the proxy member function, send to the server an invocation request message that an object identifier of a remote object, a member function identifier of the remote object member function, and an input parameter passed to the proxy member function. The method provides code to, after an invocation response message is received from the server, extract an object identifier of a remote object, a member function identifier of the remote object member function, and an output parameter from the invocation response message and indicate that the invocation of the remote object member function has completed. In some embodiments, the method further generates a server component for the server wherein the server component is generated, based on the interfaces of the remote objects hosted by, to receive from the client an invocation request message, invoke the identified remote object member function of the identified remote object passing the identified input parameter and after the invoked remote object member function returns, send to the client an invocation response message with an object identifier of the remote object, a member function identifier of the remote object member function, and an output parameter returned by the invoked remote object member function. In some embodiments, the code of the application relies on functionality provided by the browser without the need for the browser to access add-on functionality when executing the application.

In some embodiments, a client is provided that is configured to enable an application executed by an application execution engine of a program to invoke a remote object member function of a remote object of a remote object class hosted by a server. The client includes a processor to execute computer-executable instructions and a computer-readable storage medium storing computer-executable instructions that, when executed by the processor, control the client to perform the following processing. The processing instantiates a proxy of a proxy class where the proxy class includes a proxy member function with a same signature as the remote object member function. The processing associates an object identifier with the proxy where the object identifier is for use in identifying the remote object to a server. The processing invokes the proxy member function of the proxy.

Under control of the invoked proxy member function, the processing sends to the server an invocation request message that includes an object identifier that identifies the remote object and a member function identifier that identifies the remote object member function. In some embodiments, the application relies on functionality provided by the program without the need for the program to access add-on functionality when executing the application and the proxy class of the application is automatically generated from an interface of the remote object class to support accessing by the client of the remote object. In some embodiments, the processing further sends to the server an invocation request message that requests to instantiate an instance of the remote object class and receive from the server an invocation response message that indicates that the remote object has been instantiated. In some embodiments, the processing instantiates a create proxy with a member function that when invoked directs the instantiating of the proxy and the sending of the invocation request message. In some embodiments, the invocation response message includes the object identifier. In some embodiments, the program is as browser, and the application is downloaded and executed in response to a user accessing a web page via the browser.

In some embodiments, a client is provided that is configured to enable an application executed by a program with an application execution engine to invoke a remote object member function of a remote object of a remote object class hosted by a server and to support invoking by the server of a local object member function of a local object of a local object class hosted by the client. The client includes a processor that executes computer-executable instructions and a computer-readable storage medium storing computer-executable instructions that, when executed by the processor, control the client to perform the following processing. Under control of the application executed by the program, the processing instantiates a proxy of a proxy class, where the proxy class including a proxy member function with a same signature as the remote object member function. The processing instantiates a local object of the local object class. The processing associates a remote object identifier with a proxy reference to the proxy and a local object identifier with a local object reference to the local object. Under control of the invoked proxy member function, the processing sends to the server an invocation request message that includes the remote object identifier that identifies the remote object and a member function identifier that identifies the remote object member function. Upon receiving from the server an invocation request message that includes the local object identifier and identifies the local object member function, the processing retrieves the local object reference associated with to the included local object identifier and invoke the local object member function of the local object referenced by the retrieved local object reference.

In some embodiments, a method performed by a client for synchronizing a property value is provided. The method instantiates a proxy of a proxy class corresponding to a remote object of a remote object class. The remote object is instantiated at a server. The proxy class specifies a property with a proxy getter. The proxy getter for the proxy is for retrieving a value for the property that is stored in the proxy. The method sends the server an invocation request message to invoke a remote object member function of a remote object. The method receives from the server an invocation response message to the invocation request message. When the invocation response message includes a property update, the method extracts from the invocation response message the value of the property from the property update and stores the extracted value in the proxy. When the proxy getter for the property is invoked, the method allows the value of the property to be retrieved from the proxy without having to send an invocation request message to the server. In some embodiments, the proxy is part of an application that is executed by a browser. In some embodiments, the sending to the server and receiving from the server are via HTTP messages. In some embodiments, the proxy class includes a static reference to a store object of a store class with a store member function for the property and wherein the extracting and storing are performed by the store member function. In some embodiments, the store class includes a store member function for each property of the proxy class. In some embodiments, the store class includes a getter table that maps an identifier of the property to an identifier of the store member function of the store class for that property for storing the extracted value and to an identifier of a type of the property. In some embodiments, the store member function is passed a reference to a proxy and performs the extracting of the value of the property based on the type of the property and storing the value in the referenced proxy. In some embodiments, the store member function is passed the identifier of the proxy. In some embodiments, the invocation response message includes values for multiple properties of the proxy. In some embodiments, the invocation response message includes values for multiple properties of different proxies. In some embodiments, the invocation response message includes values for only those properties whose value has changed since a prior invocation response message was sent by the server.

In some embodiments, a method performed by a server for synchronizing a property value stored at a client is provided. The method receives from the client a request to invoke a remote object member function of a remote object hosted by the server. The method invokes the remote object member function of the remote object. After invoking the remote object member function of the remote object, the method retrieves a value for a property of the remote object. When the retrieved value is not the same as a last retrieved value for the property, the method adds to an invocation response message an object identifier of the remote object, a property identifier of the property, and the retrieved value. The method sends to the client the invocation response message to indicate that the remote object member function was invoked and that the value for the property has changed so that a getter member function for the property of a proxy of the client for the remote object can retrieve the value of the property locally with accessing the server. In some embodiments, the retrieving and adding are performed for multiple properties. In some embodiments, the multiple properties include properties of different remote objects. In some embodiments, the retrieving and adding are performed for each invocation response message that is to be sent to indicate that a remote object member function of a remote object was invoked.

In some embodiments, a method that is performed by a computing system is provided for supporting synchronization of values of properties of remote objects of remote object classes with values of properties of proxies of proxy classes. The method inputs a description of an interface for each remote object class. For each interface for remote object class, the method generates code for the proxy class. The method generates code for each proxy member function of the proxy class to send an invocation request message to invoke the corresponding remote object member function on a corresponding remote object. The method generates code for each proxy getter member function of a property of the proxy class to retrieve and return a value of the property that is stored locally at a proxy of the proxy class without accessing the corresponding remote object. The method generating code for storing values of the properties of the proxy class received from the server so that each proxy getter member function of a property of the proxy class can retrieve a locally stored value for the property. In some embodiments, the method further, for each proxy class, adds to the proxy class a static reference to the code for storing values of the properties. In some embodiments, the code for storing the values of the properties is implemented as part of a store class. In some embodiments, the store class includes a table that maps, for each property of the proxy class, an identifier of the property to a store member function for storing a value for that property so that the value can be retrieved by the proxy getter member function of that property. In some embodiments, the identifier of the property is further mapped to an indication of a type of the property for use in extracting the value of the property from an invocation response message received from server.

In some embodiments, a method performed by a client for sending invocation requests of an application to remote objects of a server is provided. The method receives invocation requests. Each invocation request is from a proxy of a proxy class of the application corresponding to a remote object of a remote object class. For each received invocation request, when the invocation request is deferrable, the method stores the invocation request. When the invocation request is not deferrable, the method sends to the server an invocation request message that includes each stored invocation request not previously sent and the received invocation request. The method receives from the server invocation response messages. Each invocation response message is in response to an invocation request message that included one or more invocation requests. At least one invocation response message includes multiple invocation responses. For each invocation response of a received invocation response message, when the invocation response includes an output parameter, the method extracts the output parameter from the invocation response. The method provides to the application an indication that the invocation response has been received and any extracted output parameter. In some embodiments, the invocation request message indicates an order in which the invocation requests were received. In some embodiments, the invocation responses of an invocation response message are processed in an order in which the corresponding invocation requests were received. In some embodiments, the invocation requests are asynchronous invocation requests. In some embodiments, when an invocation request has been stored for more than a designated amount of time, the method sends an invocation request message that includes the invocation request. In some embodiments, in response to receiving from the application a request to send an unsent invocation request, the method further sends an invocation request message that includes the invocation request. In some embodiments, invocation requests are received for remote objects hosted by different servers and wherein an invocation request message that is sent to a server includes only invocation requests for remote objects hosted by that server. In some embodiments, the application is executed under control of a browser.

In some embodiments, a client is provided for sending invocation requests of an application to invoke member functions of remote objects hosted by a server. The client includes a processor that executes the computer-executable instructions and a computer-readable storage medium storing computer-executable instructions that, when executed by the processor, control the client to perform the following processing. The processing queues invocation requests. Each invocation request is from a proxy of a proxy class of the application corresponding to a remote object of a remote object class of the application. The invocation request is for invoking a remote object member function of the remote object. When a send invocation request criterion is satisfied, the processing sends to the server an invocation request message that includes each queued invocation request. The processing indicates that each queued invocation request is no longer queued. The processing receives from the server an invocation response message that is in response to the invocation request message. For each invocation response of the received invocation response message, the processing provides to the application an indication that the invocation response has been received. In some embodiments, the send invocation request criterion is satisfied when an invocation request is received that is to not be queued. In some embodiments, the send invocation request criterion is satisfied when an invocation request has been stored for more than a designated amount of time. In some embodiments, the send invocation request criterion is satisfied when a request is received from the application to send queued invocation requests. In some embodiments, he invocation request message indicates an order in which the invocation requests were generated by the application. In some embodiments, the invocation responses of the invocation response message are processed in an order in which the corresponding invocation requests were generated. In some embodiments, the invocation requests are asynchronous invocation requests. In some embodiments, the invocation requests are received for remote objects hosted by different servers and wherein an invocation request message that is sent to a server includes only invocation requests for remote objects hosted by that server. In some embodiments, the application is executed under control of a program with an application execution engine.

In some embodiments, a method performed by a server for processing invocation requests of an application. The method receives from a client an invocation request message that includes invocation requests. Each invocation request is from a proxy of a proxy class of the application corresponding to a remote object of a remote object class of the application. The invocation request is for invoking a remote object member function of the remote object. For each invocation request of the invocation request message, the processes the invocation request. The processing includes extracting from the invocation request an object identifier of a remote object, a member function identifier of a remote object member function, and an input parameter. The processing invokes the identified remote object member function of the identified remote object passing the input parameter. Upon return from the invoked remote object member function, the processing stores an invocation response for the invocation request that includes an output parameter returned by the invoked remote object member function. After processing the invocation requests, the method sends to the client an invocation response message that includes the invocation responses. In some embodiments, the invocation requests are processed in an order specified by the invocation request message. In some embodiments, the invocation requests corresponding to the invocation responses are identifiable from the invocation responses. In some embodiments, Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. For example, although the OORPC system is describes primarily in the context of a web browser that executes an application, the OORPC may be used in other contexts. For example, a customer relationship management ("CRM") system may allow applications to be developed to customize the CRM system. In such a case, a client-side component of the CRM system executes applications that access objects hosted by a server that has a server-side component of the CRM system. Web browsers, CRM system, and other programs that execute such applications may be referred as a program having an application execution engine. Accordingly, the invention is not limited except as by the appended claims.

The invention claimed is:

1. A method performed by a client for synchronizing a property value, the method comprising:
   instantiating a proxy of a proxy class corresponding to a remote object of a remote object class, the remote object being instantiated at a server, the proxy class specifying a property with a proxy getter and including a static reference to a store object of a store class that includes a store member function for each of a plurality of properties of the proxy class, the proxy getter for the proxy retrieving a value for the property that is stored in the proxy;
   sending to the server an invocation request message to invoke a remote object member function of a remote object;
   receiving from the server an invocation response message to the invocation request message; and
   when the invocation response message includes a property update,
      retrieving from the property update, by the store member function, an object identifier of the remote object and an updated value of the property; and
      storing, by the store member function, the updated value in the proxy corresponding to the object identifier,
   wherein when the proxy getter for the property is invoked, the updated value of the property can be retrieved from the proxy without having to send an invocation request message to the server.

2. The method of claim 1 wherein the proxy is part of an application that is executed by a browser.

3. The method of claim 2 wherein the sending to the server and receiving from the server are via HTTP messages.

4. The method of claim 1 wherein the store class includes a getter table that maps an identifier of the property to an identifier of the store member function of the store class for that property for storing the updated value and to an identifier of a type of the property.

5. The method of claim 4 wherein the store member function is passed a reference to a proxy and performs the retrieving of the updated value of the property based on the type of the property and the value in the referenced proxy.

6. The method of claim 4 wherein the reference to the proxy is an identifier of the proxy.

7. The method of claim 1 wherein the invocation response message includes updated values for multiple properties of the proxy.

8. The method of claim 1 wherein the invocation response message includes values for multiple properties of different proxies.

9. The method of claim 1 wherein the invocation response message includes values for only those properties whose value has changed since a prior invocation response message was sent by the server.

10. A method performed by a server for synchronizing a property value stored at a client, the method comprising:
    receiving from the client a request to invoke a remote object member function of a remote object hosted by the server;
    invoking the remote object member function of the remote object;
    after invoking the remote object member function of the remote object,
       retrieving an updated value for a property of the remote object; and
       when the updated value is not the same as a last retrieved value for the property, adding to an invocation response message a property update that includes an object identifier of the remote object, a property identifier of the property, and the updated value; and
    sending to the client the invocation response message to indicate that the remote object member function was invoked and that the value for the property has changed so that a getter member function for the property of a proxy of the client for the remote object can retrieve the updated value of the property locally without accessing the server, the remote object corresponding to a proxy of a proxy class instantiated at the client, the proxy class including a static reference to a store object of a store class that includes a store member function for each of a plurality of properties of the proxy class, wherein the store member function is used to store the updated value of the property in the proxy.

11. The method of claim 10 wherein the retrieving and adding are performed for multiple properties.

12. The method of claim 11 wherein the multiple properties include properties of different remote objects.

13. The method of claim 10 wherein the retrieving and adding are performed for each invocation response message that is to be sent to indicate that a remote object member function of a remote object was invoked.

14. A method performed by a computing system for supporting synchronization of values of properties of remote objects of remote object classes with values of properties of proxies of proxy classes, the method comprising:
    inputting a description of an interface for each remote object class; and
    for each interface for each remote object class, generating code for a proxy class by:
       generating code for each proxy member function of the proxy class to send an invocation request message to invoke a corresponding remote object member function on a corresponding remote object;
       generating code for each proxy getter member function of a property of the proxy class to retrieve an object identifier of the remote object and an updated value of the property from an invocation response message received from the server, the updated value being stored locally at a proxy of the proxy class without accessing the corresponding remote object; and
       generating code for storing values of the properties of the proxy class received from the server so that each proxy getter member function of a property of the proxy class can retrieve a locally stored value for the property, each proxy class including a static reference to a store object of a store class, the store class including a getter table that maps, for each property of the proxy class, an identifier of the property to a store member function for storing a value for that property and to an indication of a type of the property, wherein the store member function is used to store the updated value of the property in the proxy.

15. The method of claim 14 further comprising, for each proxy class, adding to the proxy class a static reference to the code for storing values of the properties.

16. The method of claim 15 wherein the code for storing the updated values of the properties is implemented as part of the store class.

17. The method of claim 16 wherein the updated value of the property can be retrieved by the proxy getter member function of that property.

18. The method of claim 17 wherein the identifier of the property mapped to the indication of the type of the property is used in extracting the value of the property from the invocation response message received from the server.

19. The method of claim 14, wherein the store member function is passed a reference to a proxy and performs the retrieving of the updated value of the property based on the type of the property and the value in the referenced proxy.

20. The method of claim 19, wherein the reference to the proxy is an identifier of the proxy.

* * * * *